Jan. 14, 1964 P. D. MYERS 3,117,484
MOVABLE DETENT FASTENER FOR VARIABLE THICKNESS WORK
Filed Nov. 17, 1958
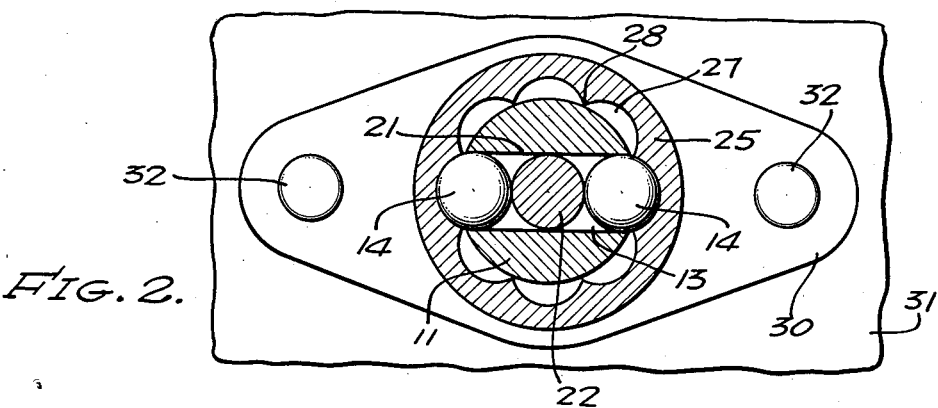
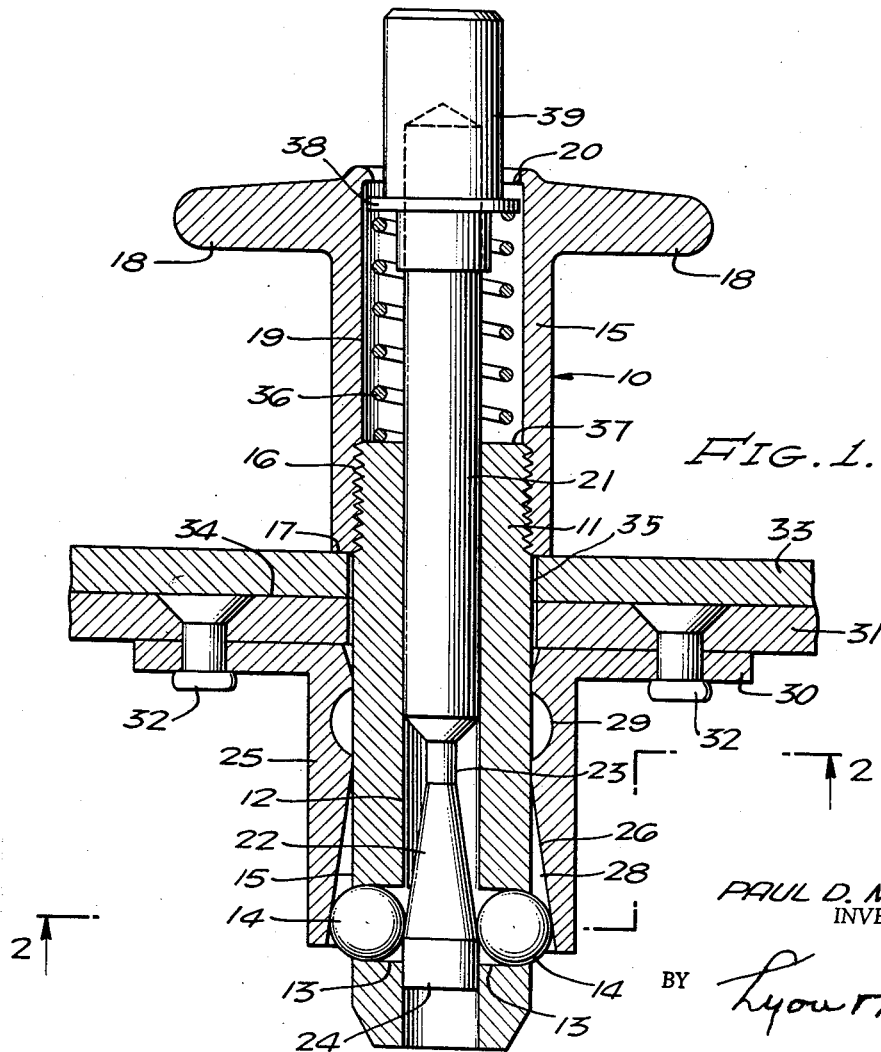
PAUL D. MYERS
INVENTOR.
BY Lyon+Lyon
ATTORNEYS 3,117,484
MOVABLE DETENT FASTENER FOR VARIABLE
THICKNESS WORK
Paul D. Myers, La Canada, Calif., assignor to Aerpat Aktien Gesellschaft, Glarus, Switzerland, a corporation of Switzerland
Filed Nov. 17, 1958, Ser. No. 774,358
8 Claims. (Cl. 85—5)

This invention relates to pin type fasteners of the type employing locking ball elements which may be projected laterally beyond the outer surface of a hollow shank by means of a plunger moving axially within the bore of the shank. A device of this general type is shown in the Spooner U.S. Patent 2,352,414. Heretofore, releasable fasteners of this type have been useful for clamping apertured parts against separation but have been unable to accommodate variations in thickness of such apertured parts. The parts to be clamped engage an external shoulder on the fastener device and the locking ball elements project outward beyond the outer surface of the shank. Since the axial distance from the shoulder to the locking ball elements remains constant, very little variation in thickness of the parts, measured in axial direction with respect to the fastener device could be tolerated.

It is the principal object of the present invention to provide a pin type releasable fastener employing laterally projectable locking ball elements, the fastener being capable of clamping together apertured parts having a wide range of thicknesses. Another object is to provide a releasable fastener device including a receptacle having a tapered bore for reception of the laterally movable locking ball elements. Another object is to provide a device of this type in which the ball-actuating axially movable plunger includes a frusto-conical surface for contact with the laterally movable locking ball elements. A more detailed object is to provide a device of this type in which the tapered bore of the receptacle includes a plurality of flutes defining cavities between them for reception of the locking ball elements, whereby relative rotary movement of the shank and receptacle is prevented when the ball elements are in locking position. Another detailed object of the invention is to provide a continuous circumferential groove within the receptacle near the small end of the tapered bore to act as a safety catch for the locking ball elements.

Other objects and advantages will appear hereinafter. In the drawings:

FIGURE 1 is a longitudinal sectional view showing a preferred embodiment of this invention.

FIGURE 2 is a sectional end view taken substantially on the lines 2—2 as shown in FIGURE 1.

Referring to the drawings, the pin type releasable fastener generally designated 10 includes a tubular shank 11 having a central axial bore 12. The shank 11 is also provided with a plurality of side apertures 13 which communicate with the bore 12. A locking ball 14 is positioned in each of the side apertures 13 respectively and is adapted to move radially outward to a position in which a portion of the ball projects beyond the cylindrical outer surface 15 of the shank 11. Each of the side apertures 13 is reduced in size near the outer end which intersects with the outer surface 15 to prevent the balls 14 from moving completely out of the apertures 13.

A handle extension 15 forming a part of the shank 11 may be connected thereto by threads 16. The forward end of this extension provides a clamping shoulder 17. A pair of laterally extending ears 18 are provided on the handle extension 15 at the end opposite the clamping shoulder. A counter bore 19 terminates at the closure lip 20.

A plunger 21 is slidably mounted within the bore 12 of the shank 11 and the forward portion of this plunger is provided with a frusto-conical surface 22 which extends from a neck 23 of reduced diameter to the full diameter pilot portion 24. The balls 14 contact the frusto-conical surface 22.

A receptacle 25 is provided with a central opening through which the tubular shank 11 may be axially inserted. This opening includes a taper bore 26 having approximately the same taper as the frusto-conical surface 22 on the plunger 21. The taper bore 26 may be frusto-conical but I prefer to form it with a series of taper cavities 27 separated by axially extending flutes 28. The cavities are shaped to conform to the balls 14. The flutes 28 prevent relative rotary movement of the receptacle 25 and shank 11.

A continuous circumferential groove 29 is provided within the interor of the receptacle 25 near the small end of the taper bore 26 to form a safety catch to receive the balls 14.

The receptacle 25 may be provided with a flange 30 and this flange may be connected to a clamping plate 31 by means of rivets 32 or other suitable fasteners. One or more work pieces such as the clamped plate 33 are clamped between the plate surface 34 and the shoulder 17. The clamping plate 31 and the work piece 33 are provided with openings or apertures 35 through which the shank 11 may be projected.

The coil spring 36 encircles a portion of the plunger 21 and is mounted within the counter bore 19. At one end this spring engages the abutment 37 on the shank 11 and at the other end the spring engages flange 38 which is formed on the actuating button 37 fixed to and forming a part of the plunger 21.

The lip 20 on the handle extension 15 engages the flange 38 to limit maximum travel of the plunger 21 in one direction when the shank 11 is outside the receptacle 25.

Although I have shown only two locking balls 14 and two side apertures 13, it will be understood that a greater number may be employed if desired.

In operation the shank 11 is manipulated by grasping the handle extension 15 between two fingers and placing the thumb over the projecting button 39. The fingers underlie the lateral projecting lugs 18. When the button 39 is depressed against the action of the spring 36 the plunger 21 is moved axially within the shank 10 to bring the small diameter neck 23 into position adjacent the balls 14, thereby permitting the balls to move radially inwardly so that they do not project beyond the outer surface 15 of the shank 11. The shank may then be axially inserted into the opening 35 in the plates 31 and 33 and projected through the interior of the receptacle 25. When the clamping shoulder 17 rests against the work piece plate 33, the actuating button 39 is released to permit the spring 36 to move the plunger 21 axially. This serves to cause the frusto-conical surface 22 on the plunger 21 to drive the balls 14 outward in the side apertures 13 into the taper bore 26 in the receptacle. If the tapered parts which are clamped are relatively thick, the balls 14 will engage the taper bore 26 near its small end and if such parts are relatively thin the balls will engage the taper bore 26 near its large end. The presence of flutes prevents relative rotary movement between the receptacle 25 and shank 11. If the flutes 28 are omitted and if the taper bore 26 is formed as a frusto-conical surface, it is possible to release the balls from their locking position by turning the shank handle 15 back and forth while applying a tension force through the lugs 18. The rolling action of the balls 14 against the frusto-conical surface 22 on the plunger gradually works the plunger in an axial direction against the force of the spring 36 to permit release of the shank from the receptacle. The presence of the flutes 28 prevents this releasing action.

It will be observed that apertured plates or other work pieces of various thicknesses may be clamped between the surface 34 and shoulder 17 and remain tightly clamped against separation until the actuating button 39 is depressed.

Having fully described my invention, it is to be understood that I do not wish to be limited to the details herein set forth but my invention is of the full scope of the appended claims.

I claim:

1. In a releasable fastener device, the combination of: a tubular shank having a central bore and having side apertures communicating with the bore, a plunger mounted for movement axially within said central bore and provided with an external tapered surface, balls mounted in said apertures adapted to move radially outward beyond the outer surface of the tubular shank, a receptacle having a bore tapered in the same direction and at substantially the same angle as the tapered surface on the plunger, the tubular shank and plunger being axially insertable into the receptacle to cause the balls to contact both the tapered surface on the plunger and the tapered bore of the receptacle, said tapered surface and said tapered bore each being substantially longer than the diameter of said balls said tapered bore of the receptacle having axially extending grooves to receive said balls.

2. The combination of claim 1 in which the tapered bore of the receptacle is provided with axial flutes shaped to receive the projecting portions of the balls therebetween.

3. In a releasable fastener device, the combination of: a tubular shank having a central bore and having side apertures communicating with the bore, a plunger mounted for sliding movement axially within said central bore and provided with an external frusto-conical surface, balls mounted in said apertures adapted to move radially outward beyond the outer surface of the tubular shank, an open-ended receptacle having a bore tapered in the same direction and at substantially the same angle as the frusto-conical surface on the plunger, the tubular shank and plunger being axially insertable into the receptacle to cause the balls to contact both the frusto-conical surface on the plunger and flaring bore of the receptacle, said tapered surface and said tapered bore each being substantially longer than the diameter of said balls, said tapered bore of the receptacle having axially extending grooves to receive said balls.

4. In a releasable fastener device, the combination of: a tubular shank having a central bore and having side apertures communicating with the bore, a plunger mounted for sliding movement axially within said central bore and provided with an external tapered surface, balls mounted in said apertures adapted to move radially outward beyond the outer surface of the tubular shank, a receptacle having a bore tapered in the same direction and at substantially the same angle as the tapered surface on the plunger, the tubular shank and plunger being axially insertable into the receptacle to cause the balls to contact both the tapered surface on the plunger and the tapered bore of the receptacle, said tapered surface and said tapered bore each being substantially longer than the diameter of said balls, said tapered bore of the receptacle having axially extending grooves to receive said balls and resilient means interposed between the shank and the plunger acting to move the plunger axially in a direction to move the balls radially outward in said apertures.

5. In a releasable fastener device, the combination of: a tubular shank having a central bore and having side apertures communicating with the bore, the shank also having an external shoulder axially spaced from said apertures, a plunger mounted for sliding movement axially within said central bore and provided with an external tapered surface, balls mounted in said apertures adapted to move radially outward beyond the outer surface of the tubular shank, a receptacle having a bore tapered in the same direction and at substantially the same angle as the tapered surface on the plunger, the tubular shank and plunger being axially insertable into the receptacle to cause the balls to contact both the tapered surface on the plunger and the tapered bore of the receptacle, said tapered surface and said tapered bore each being substantially longer than the diameter of said balls, said tapered bore of the receptacle having axially extending grooves to receive said balls, whereby one or more members may be clamped between the receptacle and said shoulder.

6. The combination of claim 5 in which the tapered bore of the receptacle is provided with axial flutes shaped to receive the projecting portions of the balls therebetween.

7. In a releasable fastener device, the combination of: a tubular shank having a central bore and having side apertures communicating with the bore, the shank also having an external shoulder axially spaced from said apertures, a plunger mounted for sliding movement axially within said central bore and provided with an external tapered surface, balls mounted in said apertures adapted to move radially outward beyond the outer surface of the tubular shank, a receptacle having a bore tapered in the same direction and at substantially the same angle as the tapered surface on the plunger, the tubular shank and plunger being axially insertable into the receptacle to cause the balls to contact both the tapered surface on the plunger and the tapered bore of the receptacle, said tapered surface and said tapered bore each being substantially longer than the diameter of said balls, said tapered bore of the receptacle having axially extending grooves to receive said balls, the tubular shank having a counterbore, and a spring in the counterbore encircling a portion of the plunger acting to move the plunger axially, whereby the balls may be moved radially outward in said apertures to prevent axial separating movement of said shoulder and receptacle.

8. In a releasable fastener device, the combination of: a tubular shank having a central bore and having side apertures communicating with the bore, a plunger mounted for sliding movement axially within said central bore and provided with an external tapered surface, balls mounted in said apertures adapted to move radially outward beyond the outer surface of the tubular shank, a receptacle having a bore tapered at substantially the same angle as the tapered surface on the plunger, the tapered bore of the receptacle and the tapered surface of the plunger being substantially longer than the diameter of the balls, the tapered bore of the receptacle having axially extending grooves to receive the balls and the receptacle having an internal circumferential groove near the small end of the tapered bore, the tubular shank and plunger being axially insertable into the receptacle to cause the balls to contact both the tapered surface on the plunger and the tapered bore of the receptacle, and resilient means interposed between the shank and the plunger acting to move the plunger axially in a direction to move the balls radially outward in said apertures.

References Cited in the file of this patent

UNITED STATES PATENTS

| 408,320 | Powell | Aug. 6, 1889 |
| 677,373 | Rauhoff | July 2, 1901 |
| 1,777,349 | Cantone | Oct. 7, 1930 |
| 2,373,083 | Brewster | Apr. 3, 1945 |
| 2,472,651 | Diaper | June 7, 1949 |
| 2,901,804 | Williams | Sept. 1, 1959 |
| 2,906,311 | Boyd | Sept. 29, 1959 |

FOREIGN PATENTS

| 212,487 | Switzerland | Feb. 17, 1941 |
| 897,080 | France | Mar. 15, 1944 |
| 894,652 | France | Mar. 20, 1944 |